C. E. ABBOTT.
Lamp Extinguisher.

No. 71,112.  Patented Nov. 19, 1867.

WITNESSES:
William C. Cleveland
H. Larnan Smith

INVENTOR:
Chas. E. Abbott
By his attorney
Chas. F. Ransbury

United States Patent Office.

CHARLES E. ABBOTT, OF MALDEN, MASSACHUSETTS.

Letters Patent No. 71,112, dated November 19, 1867.

LAMP-EXTINGUISHER.

*The Schedule referred to in these Letters Patent and making part of the same.*

TO ALL WHOM IT MAY CONCERN:

Be it known that I, CHARLES E. ABBOTT, of Malden, in the county of Middlesex, and State of Massachusetts, have invented a new and useful Improvement in Lamp-Extinguishers; and I do hereby declare the following to be a full and correct description of the same, reference being had to the accompanying drawings, in which—

The same letter marks the same part whenever it occurs.

This invention is an improvement on the lamp-extinguishers invented by me, and patented July 3, 1866, and November 13, 1866. In the first of these, the supplemental wick-tube, carrying the extinguishing-lid, was operated by a rack and pinion. In the second, I substituted a lever for the rack and pinion as the means of operating the tube; but in both, the force of gravity was alone relied upon to cause the fall of the lid upon the top of the tube to extinguish the lamp.

The present invention consists chiefly in the addition of a positive movement to the force of gravity, to insure the fall of the lid and hold it closed.

It further consists in the use of a spring, to produce friction upon the lever sufficient to hold it in any position; and the employment of a stop to limit the upward movement of the lever; all as hereinafter set forth.

Figure 1:
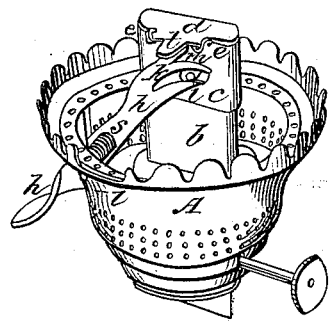
Figure 1 is a perspective view of a lamp-top having my improved extinguisher applied, it being shown in the position it occupies when the lamp is extinguished.
Figure 2:
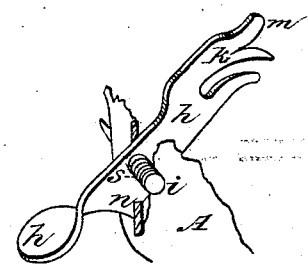
Figure 2 is a detail view of the lever which operates the extinguisher.
Figure 3:
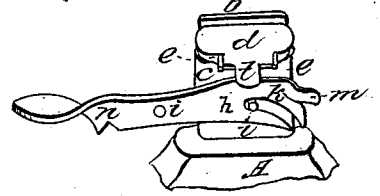
Figure 3 is a perspective view, showing the relative positions of the parts when the lamp-tube is open, as when the lamp is burning.

To enable others to make use of my improvement, I will proceed to describe its construction and operation, referring to the drawings, whereon A marks the ordinary lamp-top, the cap being removed to show more clearly the wick-tube, and the parts connected therewith. $b$ is the wick-tube, on the outside of which slides up and down the tube $c$, to which is hinged the cover or lid $d$, the hinges $e$ being so arranged that the lid will fall by gravity when the tube $c$ is in its uppermost position, as in fig. 1. From the rear side of lid $d$ projects a tongue, $t$. $h$ is a lever, which works on pin $i$ as its fulcrum. A spiral spring, $s$, surrounds this pin, and bears against the lever $h$, to hold it in any position required. The lever $h$ has a finger-piece at its outer end, by which it is conveniently operated. Its inner end is flattened, and has a slot, $k$, in it, which receives and moves on a pin, $l$, projecting from the side of tube $c$, so that the operation of the lever will raise or lower the tube $c$, as may be desired; the throw of the lever being sufficient to carry the tube so high that the lid, when closed, will be above the top of the wick. From the extreme inner end of lever $h$ projects a bent finger, $m$, arranged to come into contact with the under surface of tongue $t$ on the rear of the lid $d$ when the tube $c$ is approaching its highest position. It closes the lid $d$, and holds it closed, while the tube $c$ remains in its highest position. A notch, $n$, in lever $h$, operates as a stop, by engaging with the side of the lamp-top, to prevent the inner end of lever $h$ from rising too high, so as to bend the tongue $t$, or force the lid $d$ from its hinges.

The operation is the same as in my previously-patented extinguishers. When the lamp is burning, or about to be lighted, the parts have the relative positions shown in fig. 8. To extinguish the lamp, it is only necessary to depress the outer end of lever $h$, when the parts will be brought into the positions shown in fig. 1, the lid $d$ being closed over the wick.

Having thus fully described my invention, what I claim, and desire to secure by Letters Patent, is—

1. The arrangement, for conjoint operation, of the tongue $t$ and finger $m$, as and for the purpose set forth.
2. The spring $s$, in combination with the pin $i$ and lever $h$, arranged and operating as specified.
3. The stop-notch $n$ on lever $h$, operating as and for the purpose described.

The above specification of my said invention signed and witnessed at Boston, this 27th day of July, A. D. 1867.

CHARLES E. ABBOTT.

Witnesses:
WILLIAM C. CLEVELAND,
CHAS. F. STANSBURY.